April 26, 1938.   J. H. HANLEY   2,115,632
DEVICE FOR RAISING AND LOWERING AUTOMOBILE WINDOW GLASS
Filed Sept. 13, 1937   2 Sheets-Sheet 1

J. H. Hanley
INVENTOR
BY Victor J. Evans & Co.
ATTORNEYS

April 26, 1938. J. H. HANLEY 2,115,632
DEVICE FOR RAISING AND LOWERING AUTOMOBILE WINDOW GLASS
Filed Sept. 13, 1937 2 Sheets-Sheet 2

J. H. Hanley
INVENTOR

BY Victor J. Evans & Co.
ATTORNEYS

Patented Apr. 26, 1938

2,115,632

UNITED STATES PATENT OFFICE 2,115,632

DEVICE FOR RAISING AND LOWERING AUTOMOBILE WINDOW GLASS

John H. Hanley, Chelsea, Okla.

Application September 13, 1937, Serial No. 163,665

2 Claims. (Cl. 268—132)

This invention relates to a window glass operating device for automobiles and has for the primary object the provision of an efficient and inexpensive device of this character which may be readily installed on an automobile and which will permit a person to rapidly raise or lower the glass through the simple movement of a hand lever, obviating the present practice of rotating the crank handle a large number of times to raise and lower the window glass, consequently the present invention detracts a person's attention to a much less degree from the control of an automobile and requires less effort on the part of the person for the operation of the device.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a rear elevation illustrating a window glass operating device for automobiles constructed in accordance with my invention and showing the same installed on a panel of an automobile body.

Figure 1:
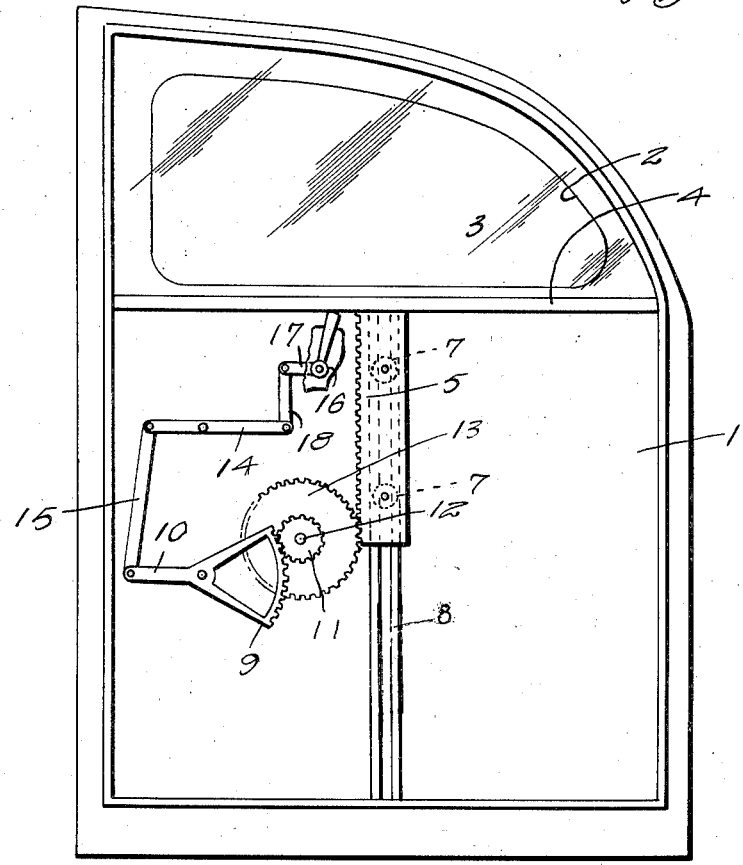
Figure 4:
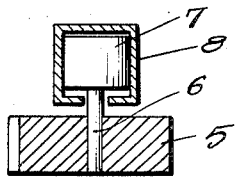
Figure 4 is a detail sectional view showing means of mounting a rack bar of the window frame.
Figure 2:
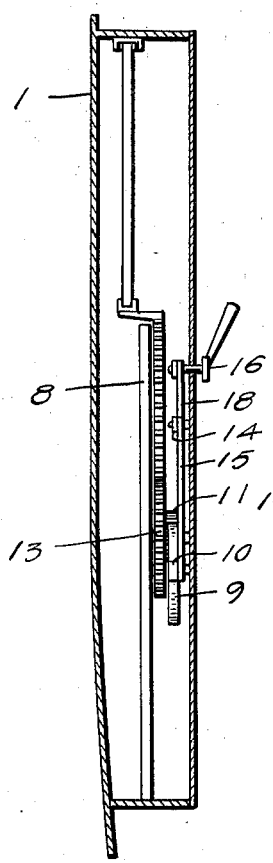
Figure 2 is a transverse sectional view illustrating the device.
Figure 3:
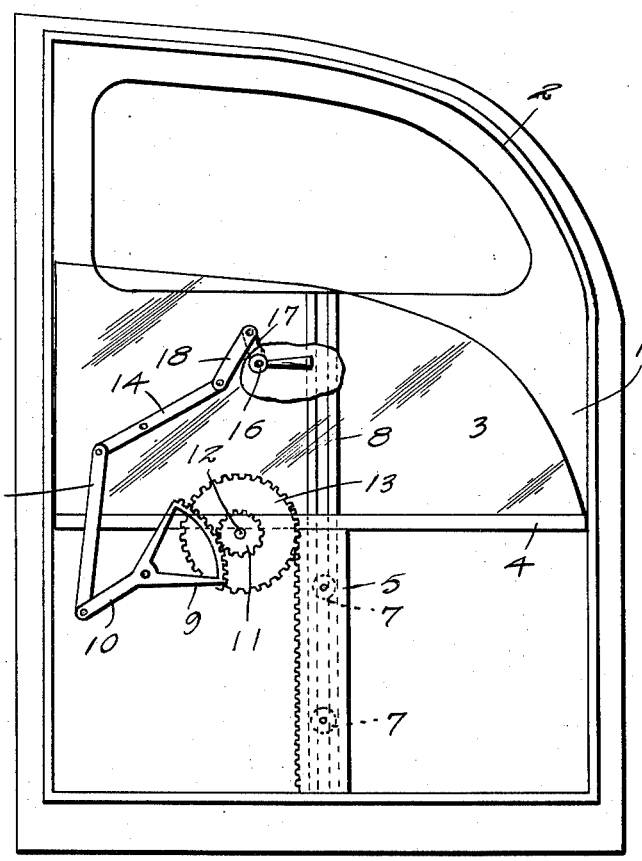
Figure 3 is a view similar to Figure 1 showing a glass and frame in the lowered position through the actuation of the present invention.

Referring in detail to the drawings, the numeral 1 indicates a panel of an automobile body, 2 a window frame, 3 a glass panel and 4 a frame for the panel. The window is opened and closed by a sliding movement of the panel 3 and its frame 4, the latter having formed integrally therewith a depending rack bar 5 to which are secured pins or shafts 6 having journaled thereon rollers 7. Secured on the panel 1 is a vertical guide 8 of channeled construction. The rollers 7 operate in the guide 8 and slidably support the rack bar for movement with a minimum amount of friction. A segmental rack gear 9 is pivoted on the panel 1 and includes an arm 10 and meshes with a pinion 11 secured on a shaft 12. The shaft is suitably supported on the panel 1 and has secured thereto a gear 13 which meshes with the rack bar 5. The gear ratio between the segmental gear 9 and the rack bar 5 is such that the latter will be caused to travel a maximum distance with a minimum movement of the segmental gear 9.

A lever 14 is pivoted intermediate its ends on the panel 1 and one end thereof is connected to the arm 10 by a link 15 and the other end is connected to a hand operated lever 16 or an arm 17 thereof by a link 18. The links and levers heretofore described as well as the gears and rack bar are confined within the walls of the panel while the hand lever 16 is arranged exteriorly of the panel so that a person may readily grasp the handle and impart movement thereto for the purpose of raising or lowering the glass panel 3. It is only necessary that the hand lever be moved a short distance in order to bring about complete raising and lowering of the glass panel.

What is claimed is:

1. A window glass operating device for automobiles comprising a rack bar fixed to a slidable window, means for slidably supporting said rack bar, a segmental shaped gear, gearing connecting said segmental gear to said rack bar, a lever pivotally mounted intermediate its ends, a link connected to one end of said lever, an arm formed on said segmental gear and connected to said link, a second link connected to the other end of said lever, and a hand lever movably mounted and including an arm connected to the second-named lever.

2. A window glass operating device for automobiles comprising a rack bar fixed to a slidable window, pins carried by said rack bar, rollers mounted on said pins, a channeled guide receiving said rollers, a pivotally mounted arm, gearing connecting said arm to said rack bar, and an operating means connected to said arm.

JOHN H. HANLEY.